United States Patent
Reid

(10) Patent No.: US 7,252,118 B2
(45) Date of Patent: Aug. 7, 2007

(54) MOTOR COIL WINDING AND INSERTION METHOD AND APPARATUS

(75) Inventor: Ray Thomas Reid, Kings Mountain, NC (US)

(73) Assignee: Reliance Electric Technologies, LLC, Mayfield, OH (US)

( * ) Notice: Subject to any disclaimer, the term of this patent is extended or adjusted under 35 U.S.C. 154(b) by 639 days.

(21) Appl. No.: 10/675,035

(22) Filed: Sep. 30, 2003

(65) Prior Publication Data

US 2005/0067043 A1     Mar. 31, 2005

(51) Int. Cl.
*H02K 15/04*     (2006.01)
(52) U.S. Cl. .......................... 140/92.1; 29/732; 29/596
(58) Field of Classification Search ............... 140/92.1; 29/736, 596, 732; 242/361.3
See application file for complete search history.

(56) References Cited

U.S. PATENT DOCUMENTS

| | | | |
|---|---|---|---|
| 3,630,240 A | * | 12/1971 | Eminger et al. ........... 140/92.1 |
| 3,686,735 A | * | 8/1972 | Hill et al. ...................... 29/732 |
| 3,958,611 A | * | 5/1976 | Lesch et al. ................ 140/92.1 |
| 4,434,819 A | | 3/1984 | Kubota et al. |
| 4,449,293 A | | 5/1984 | Itoh et al. |
| 4,470,436 A | * | 9/1984 | Kubota et al. ............. 140/92.1 |
| 4,800,646 A | * | 1/1989 | Russell ........................ 29/736 |
| 5,251,678 A | * | 10/1993 | Orecchia .................... 140/92.1 |

FOREIGN PATENT DOCUMENTS

| | | |
|---|---|---|
| JP | 56001514 | 1/1981 |
| JP | 56094948 | 7/1981 |
| JP | 58066560 | 4/1983 |
| JP | 2003319662 | 11/2003 |

* cited by examiner

*Primary Examiner*—Dmitry Suhol
(74) *Attorney, Agent, or Firm*—Thompson Coburn, LLP

(57) ABSTRACT

According to one aspect, the present technique provides methods and apparatus for inserting coil windings into a stator. Advantageously, the windings may be wound in a vertical configuration to facilitate insertion of the windings into stator slots. Moreover, the exemplary embodiment provides a transfer tool that maintains the stepped and vertical configurations of the coil windings developed during winding upon separation of the wire from the winding form. Advantageously, the present technique may decrease motor fabrication times and improve motor performance.

23 Claims, 7 Drawing Sheets

MOTOR COIL WINDING AND INSERTION METHOD AND APPARATUS

BACKGROUND OF THE INVENTION

The present invention relates to a technique for assembling motor stators. More particularly, the present invention relates to a method and apparatus for insertion of coil windings into a stator.

Electric motors of various types are commonly found in industrial, commercial and consumer settings. In industry, such motors are employed to drive various kinds of machinery, such as pumps, HVAC systems, conveyors, chillers, compressors, fans and so forth, to mention only a few. Conventional alternating current electric (ac) motors may be constructed for single or multiple phase power, and are typically designed to operate at predetermined synchronous speeds, such as 3600 rpm, 1800 rpm, 1200 rpm, and so on. Such motors generally include a stator, comprising a multiplicity of coils, surrounding a rotor, which is supported by bearings for rotation in the motor housing or compartment. In the case of ac motors, ac power applied to the motor creates magnetic excitation causing the rotor to rotate within the stator. The speed of this rotation is typically a function of the frequency of the applied ac input power (i.e., frequency) and of the motor design (i.e., the number of poles defined by the stator windings). A rotor shaft extending through the motor housing takes advantage of this produced rotation and translates the rotor's movement into a driving force for a given piece of machinery. That is, rotation of the shaft drives the machine to which it is coupled. The driving force is typically expressed as a horsepower (HP) or kilowatt (kW) rating, and is a function of the active material employed in the motor design.

Traditionally, the construction of large commercial ac motors is a labor-intensive, manual process. More specifically, the formation, insertion, and arrangement of coil windings with respect to the stator may be an arduous process. Typically, coil windings are formed by feeding conductive wire onto or about a rotating winding form, which loops the wire around wire guides or channels that are arranged in a sequentially arranged stepped configuration, thereby forming graduated bundles of coiled wire arranged in a generally parallel manner with respect to one another. However, in traditional coil windings, the conductor bundles are wound in a generally horizontal configuration. That is, the cross sectional width of each bundle of coiled wire, as determined with respect to the base of the wire guide or channel in which it is wound, is greater than its height. By contrast, the stator slots into which the bundles of coiled wire are inserted typically present a cross sectional profile with a vertical orientation, that is a cross sectional profile with a greater height than width. Accordingly, typical coil winding fabrication techniques require rearrangement of the bundles of coiled wire into a vertical configuration to more closely match the profile (i.e., vertical orientation) of the stator slots. Thus, once the bundles of coiled wire (i.e., conductor bundle) are removed from the winding form, an additional step to reconfigure the bundles into the vertical configuration is generally undertaken.

To reconfigure the bundles for insertion into a stator, a separate transfer tool is typically employed. Traditional transfer tools comprise vertical sorting members that receive and funnel the bundles of coiled wire into vertically oriented channels, thereby reconfiguring the bundles from the horizontal configuration to the vertical configuration. Once reconfigured into the vertical configuration, the bundles of coiled wire better correspond with the vertical orientation of the stator slots. Accordingly, the transfer tool may be coupled to an insertion tool and dragged through the interior of the stator core, thereby threading and feeding the bundles of coiled wire into the appropriate stator slots. However, by reconfiguring the bundles, the tightly packed organization of each bundle establish during the traditional coil winding is generally lost, thereby leading to current imbalance in the motor, which leads to reduced motor performance during operation.

Moreover, traditional fabrication techniques do not maintain the stepped configuration developed during the coil winding process. In other words, although conventional transfer tools may maintain segregation between the graduated bundles, the graduated or concentric stepped arrangement between the bundles is lost during the coil transfer and insertion steps. The stepped configuration is useful, however, in allowing coils at ends of the stator to be pressed into an axially nested arrangement (i.e., at the same general radial dimension) to reduce the space required for the winding ends. Thus, to achieve proper operational balance of the motor and to properly nest the bundles of coiled wire for formation of the coil winding end turns, the stepped configuration is generally reestablished after the bundles of coiled wire have been inserted into the appropriate slots of the stator. This phase of fabrication (i.e., reestablishment of the stepped configuration of the bundles of coiled wire) is typically completed manually, that is by hand. Manual arrangement of the bundles of coiled wire is a labor intensive and time-consuming process. Moreover the manual process, because of human error and imprecision, may lead to inconsistencies in the alignment of with the windings of each group and between the windings of each group, thereby leading to current imbalance and reduced motor performance during operation.

There is a need, therefore, for an improved technique for fabricating electric motors. More particularly, there is a need for a technique that improves the fabrication and installation of coil windings into a motor stator.

SUMMARY OF THE INVENTION

The present invention provides an improved technique for fabricating electric motors. The technique may be applied in a wide range of settings, but is particularly well suited for use in industrial ac motors. In one exemplary embodiment of the present technique, a tool for transferring coil windings to a motor stator is provided. The tool includes first and second coil support portions that maintain first and second bundles of coiled wire at different heights. The tool further includes a partitioning member disposed between the first and second coil support portions.

According to another embodiment, the present technique provides a form assembly for coiling wire. The form assembly includes a winding assembly having first and second wire guides that are configured to receive bundles of wire. The winding assembly is configured to arrange the bundles of wire in a stepped configuration with respect to one another. Additionally, the form assembly includes a transfer tool that is selectively couplable to the winding assembly. Advantageously, the transfer tool is configured to maintain the stepped configuration of the bundles of wire upon removal of the wire from the wire guides. Moreover, in accordance with another embodiment, the transfer tool may also be configured to maintain each bundle of wire in a vertical configuration upon removal of the bundles of wire from the wire guides. Advantageously, the vertical configuration of the bundles may place the bundles of wire in a configuration that better coincides with the orientation of the stator slots into which the bundles of wire are inserted.

The present technique also provides a method for forming coiled bundles of wire for insertion into a motor stator. In the exemplary method, wire is fed into first and second wire guides having channels that arrange the coiled bundles of wire in each guide into a stepped configuration with respect to one another. Once properly arranged, the coiled bundles of wire may be removed from the wire guides via a transfer tool that maintains the stepped configuration of the coiled bundles. Advantageously, the exemplary method may also include arranging each coiled bundle of wire in a vertical configuration and maintaining the vertical configuration via the transfer tool upon separation of the bundles from the wire guides.

A method is also provided for transferring coiled bundles of wire from a winding form to a motor stator. In the exemplary embodiment, a transfer tool may be appropriately located with respect to and engaged with the coiled bundles of wire such that the configurations established during winding (e.g., stepped and/or vertical configuration) are maintained upon removal of the bundles of wire from the wire guides.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
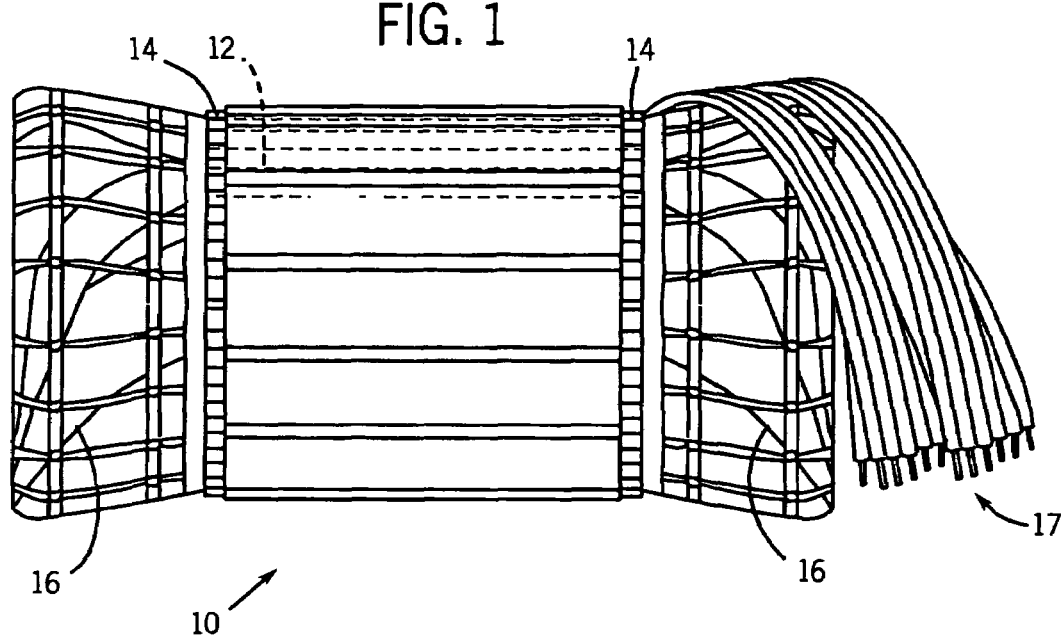
FIG. 1 is perspective view of an exemplary motor stator in accordance with the present technique having coil windings disposed therethrough.

Turning to the drawings and referring first to FIG. 1, an exemplary motor stator 10 for use in a motor is shown. By way of example, the stator 10 may be employed in an ac induction motor for use in industrial applications, such as HVAC units, chillers, conveyers, compressors, pumps, fans, and so forth, to name only a few. In the exemplary embodiment, as discussed further below, the stator 10 comprises forty-eight slots, and is configured for use in a two-pole, three-phase ac induction motor. Although the present technique is described in relation to an industrial application, it may be applied to any number of modalities such as, commercial and residential applications. The exemplary stator 10 may be formed of metallic materials, such as steel and aluminum, and may conform to applicable NEMA (National Electrical Manufactures Association) standards. The exemplary stator 10 has a generally circular profile, and includes a central aperture configured to receive a rotor. Those of ordinary skill in the art appreciate the relationship between motor stators and rotors and workings thereof.

Figure 8:
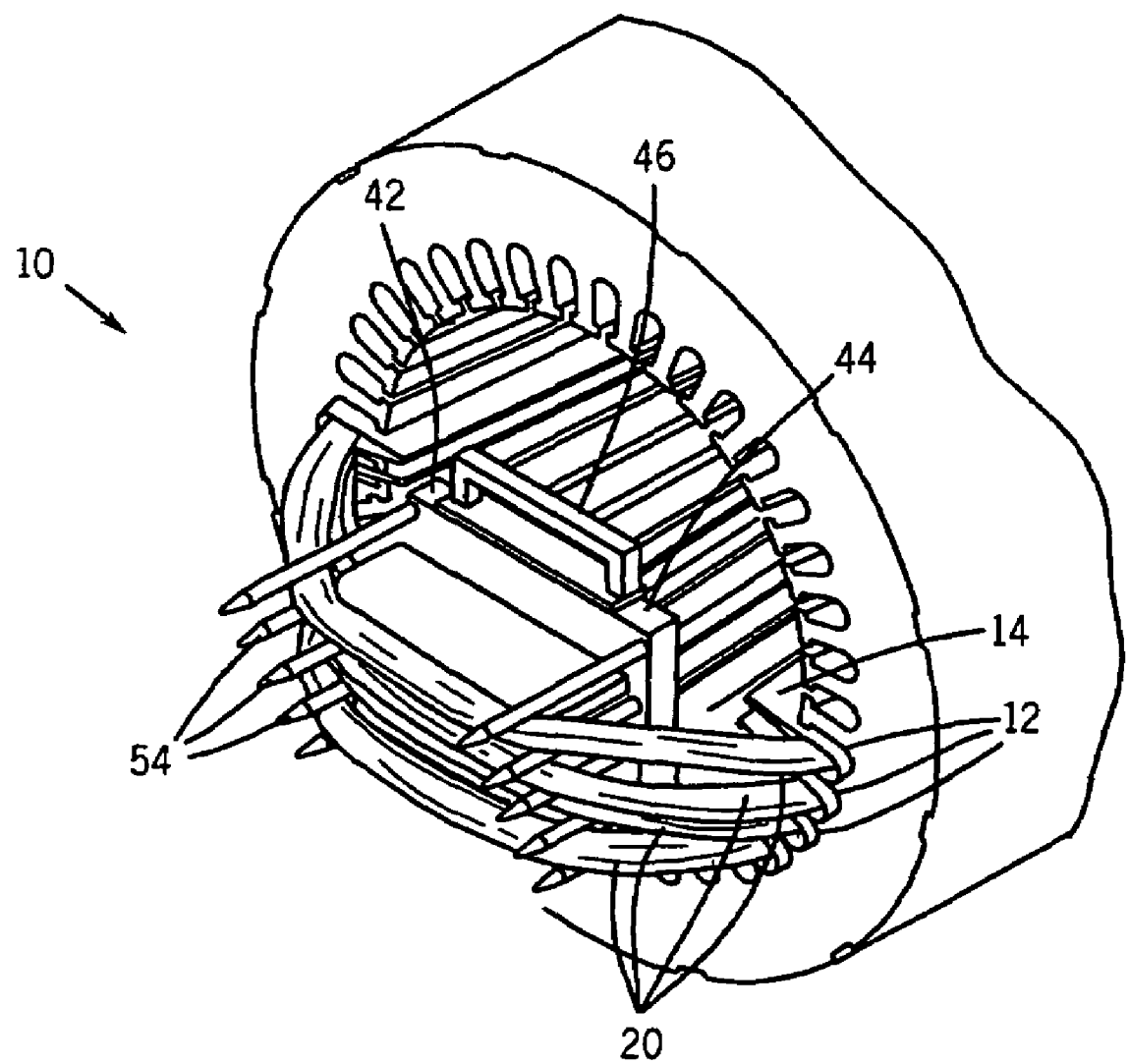
FIG. 8 is a partial perspective view of the motor stator of FIG. 1 illustrating the insertion of coil windings into the slots of the motor stator in accordance with aspects of the present technique.

Extending longitudinally through an inner periphery of the exemplary stator 10 are a series of slots 12, which are configured to receive coil windings (see FIG. 8). As stated above, the illustrated stator 10 includes forty-eight evenly spaced slots 12 located concentrically about an inner periphery of the stator 10. Advantageously, slots liners 14 may be located in each of the slots 12 to isolate and protect the coil windings disposed in each slot 12. Portions of the coil windings that extend beyond the stator slots 12 may be laced and bound into coil ends 16, as are known to those of ordinary skill in the art.

During operation of the motor, to induce rotation of the rotor, current is routed through the coil windings disposed in the stator 10 and the coil ends 16. As discussed further below, coil windings are electrically interconnected to form groups, which are, in turn, interconnected in a manner generally known in the pertinent art. The coil windings are further coupled to terminal leads 17, which electrically connect the coil windings to an external power source, such as 480 Vac three phase power or 110 Vac single phase power. Because the exemplary motor is a two pole, three phase ac motor, twelve terminal leads 17 are illustrated. Those of ordinary skill in the art will appreciate the fact that each pair of leads 17 may be configured to carry one phase of three phase power through the corresponding group of coil windings. By routing electrical current from an external power source through the coil windings, a magnetic field is produced that induces rotation of the rotor. The torque produced by rotation of the rotor may be harnessed, for example, to drive any number of machine elements, as discussed above. By increasing the amount of electrical current in the coil windings (e.g., by increasing the amount of the wire in the coil windings), the larger the magnetic field produced. In the exemplary motor, by increasing the density or number of conductors of the coil windings in comparison to conventional motor designs, a more beneficial amount of torque may be produced, where certain applications require additional torque, such as for start-up under loaded conditions.

Figure 2:
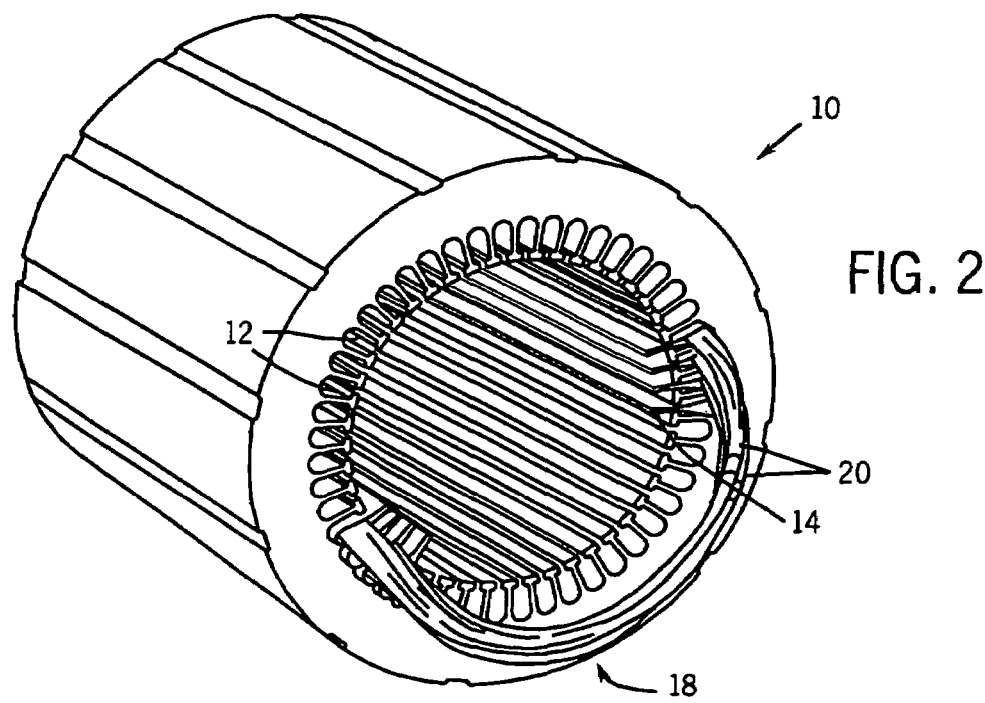
FIG. 2 is a perspective view of the motor stator of FIG. 1 illustrating a group of coil windings disposed in slots of the motor stator.

In a forty-eight slot, two pole, three phase motor that is wound in a non-shared concentric winding pattern, as presently discussed, each phase of power is carried by two groups of coil windings. That is, each phase of power is carried by coil windings disposed in sixteen discrete slots 12 of the stator 10, each group being carried in eight discrete slots 12. As illustrated in FIG. 2, each group 18 of coil windings resides in eight discrete slots 12 of the stator 10, wherein each group 18 of coil windings is defined by four coil loops 20 that each reside in two discrete slots 12. Indeed, the exemplary stator 10 will house six groups 18, each group having four coil loops 20, in which each loop occupies two stator slots 12. The arrangement of the coil loops 20, more particularly the slots 12 in which each coil loop 20 resides, may vary depending on the construction of the motor. For example, the coil loops 20 may be arranged in any number of winding patterns, such as a concentric winding pattern, a lapped winding pattern, a shared slot winding pattern, and so forth, to name only a few. As discussed further below, the coil loops 20 of each group 18 may be arranged in a stepped configuration with respect to one another. Advantageously, by arranging the coil loops 20 in a stepped configuration, the coil loops 20 of each group may be nested with respect to one another, thereby facilitating binding and lacing of the coil ends 16 (see FIG. 1). That is, as shown in FIG. 2, the coil loop 20 of each group may be flattened with respect to one another and against the stator 10.

Figure 3:
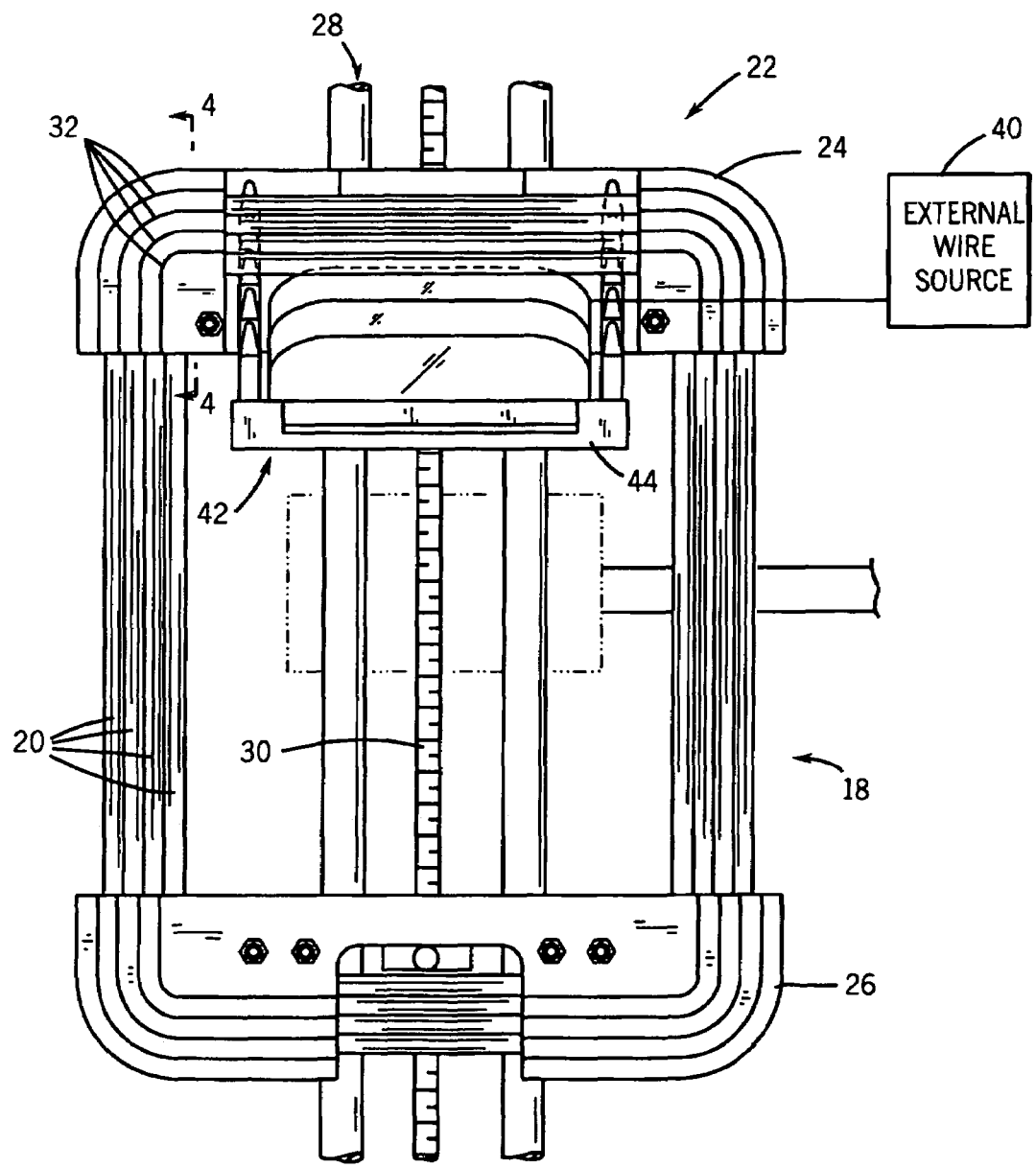
FIG. 3 is a plan view of an exemplary winding assembly having features in accordance with the present technique illustrated in an extended configuration.

To form each group 18 of coil windings, a coiling assembly 22, as illustrated in FIG. 3, may be employed. The exemplary coiling assembly 22 comprises a pair of similarly shaped winding shrouds 24 and 26 coupled to a frame assembly 28. The shrouds 24 and 26 may be formed of any number of materials, such as plastic, aluminum, steel, or any other suitable material. The exemplary frame assembly 28 is configured to selectively increase and decrease the distance between the winding shrouds 24 and 26. That is, the frame assembly 28 may collapse and extend the distance between the winding shrouds 24 and 26 with respect to one another selectably. By way of example, the distance between the winding shrouds 24 and 26 may varied by actuation of a lead screw 30 appropriately coupled to the frame assembly 28 and the winding shrouds 24 and 26. Advantageously, by adjusting the distance between the winding shrouds 24 and 26, the coiling assembly 22 may be configured for various stator and motor designs (i.e., stator lengths). Moreover, the winding shrouds are typically configured (e.g., in width) for each individual motor frame for which coils are to be wound.

Figure 4:
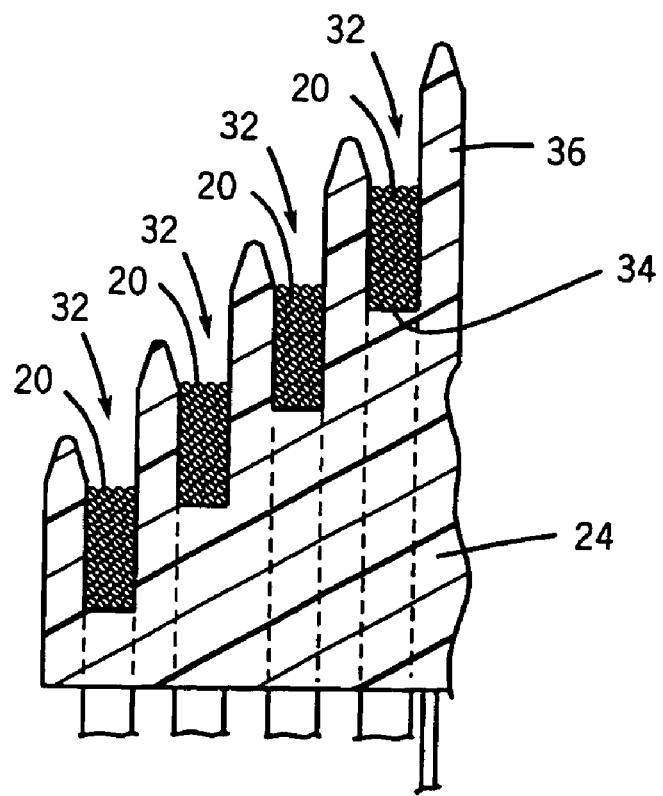
FIG. 4 is a cross sectional view of the winding assembly of FIG. 3 along line 4-4.

Located in each of the exemplary winding shrouds 24 and 26 are a plurality of channels 32, as best illustrated in FIG. 4, that are arranged in a graduated (i.e., stepped) arrangement with respect to one another. A floor portion 34 and a pair of adjacent dividers 36 define the channels 32 of the exemplary winding shrouds 24 and 26. However, those of ordinary skill in the art appreciate that the channels 32 may be formed of and defined by any number of structures. Advantageously, as discussed further below, each of the channels 32 has a vertical orientation, that is each channel 32 presents a greater cross sectional height than width (as determined with respect to the orientation of FIG. 4).

To form the coil loops 20 of each group 18, conductive wire 38, such as a magnetic wire, the likes of which are commonly known to those of ordinary skill in the pertinent art, may be fed onto or about the coiling assembly 22 from an external wire source 40, such as a wire spool. By rotating the coiling assembly 22 in a circular motion, more particularly, by rotating the winding shrouds 24 and 26 concentrically with respect to one another, wire 38 is drawn from the external wire source 40 and spooled into each of the graduated channels 32. In other words, each pair of corresponding channels 32 on the respective winding shrouds 24 and 26 provides a form to coil and bundle the wire 38 into a first coil loop 20. Once the first coil loop 20 is completed, the wire 38 is directed into the adjacent pair of graduated channels 32, thereby forming a second coil loop 20 of the group 18. However, simultaneous winding may also be envisaged. As can be seen from FIG. 3, the stepped arrangement of the channels 32 produces concentrically arranged coil loops 20 that are successively larger (i.e., extend a greater distance longitudinally) with respect to one another. Advantageously, the coil loops 20 of each group 18 may be formed of one continuous length of wire 38 that is wound into the concentrically coiled and stepped configurations discussed above. Moreover, the vertical orientation of each channel 32, as illustrate in best in FIG. 4, produces coil loops 20 that are arranged in a vertical configuration. That is, the cross sectional height of each coil loop 20 is greater than its cross section width (as oriented in FIG. 4). As discussed further below, a number of advantages may be achieved by vertically orienting each of the channels 32.

Figure 5:
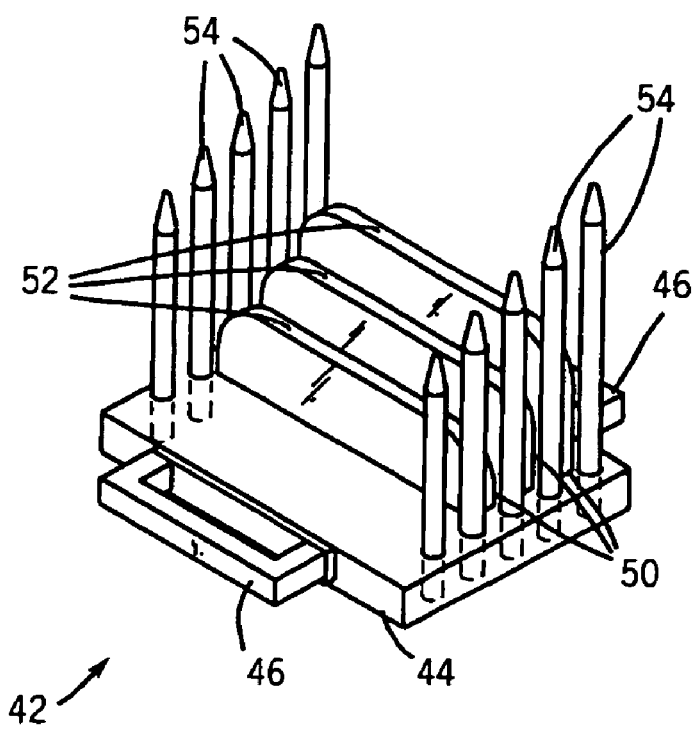
FIG. 5 is a perspective view of an exemplary transfer tool having features in accordance with the present technique.

The coiling assembly 22 may also include a transfer tool 42 (as best illustrated in FIG. 5). The transfer tool 42 may be selectively couplable to the winding assembly by any number of securing mechanisms, such as latches, bolts, and tab-and-slot structures, to name only a few. In other words, the transfer tool 42 may be integratable with respect to the coiling assembly 22. To receive the transfer tool 42, as discussed further below, one or both of the winding shrouds 24 and 26 may include a recessed portion or opening 44. For example, the central portion of the upper winding shroud 24 may have an indented section sized to correspond with the transfer tool 42, to allow, as discussed further below, the transfer tool 42 access to the coil loops 20. Advantageously, by coupling the transfer tool 42 to the coiling assembly 22, the transfer tool 42 may rotate with the winding shrouds 24 and 26, and, as such, portions of the transfer tool 42 may provide guidance to the wire 38 as it is fed into the respective channels 32 of the upper winding shroud 24, and maintain the aspect ratio of the coils during the transfer and installation process.

Turning to FIG. 5, a perspective view of the exemplary transfer tool 42 is illustrated. The transfer tool 42 comprises a generally parrallelepipedic base portion 44 formed of plastic, metal, or any other suitable material. Advantageously, the base portion 44 may include features helpful to a motor fabricator, such as handles 46, which facilitate transfer of the coil winding group 18 to the stator 10 (see FIG. 1) for insertion therein, as further discussed below. Coupled to the base portion 44 of the exemplary transfer tool 42 are a plurality of raised coil supports 50, which, advantageously, conform to the stepped configuration of the channels 32 of the shrouds (see FIG. 4). That is, the vertical distance between the top surfaces 52 of adjacent coil supports 50 generally corresponds to the vertical distance between the floor portions 34 of adjacent channels 32 of the winding shrouds 24 and 26 (see FIG. 4). The coil supports 50 may be formed of any number of materials, such as plastic, metal, or any other suitable material.

The exemplary transfer tool 42 also includes partition members 54 coupled to the base portion 44 and located between adjacent coil supports 50. The partition members 54 may be metal, spear-like or post members that extend in a generally vertical direction from the base portion 42. Other materials and configurations may, of course, also be envisaged. The horizontal distance (with reference to FIG. 5) between adjacent partition members 54 may correspond to the cross section width of the channels 32 of the shrouds (i.e., the distance between the adjacent dividers 36 that define each channel 32). Advantageously, as discussed further below, the partition members 54 may be spaced to maintain the vertical configuration of the coil loops 20 developed during winding, upon their removal from the winding shrouds 24 and 26 (see FIG. 3).

Figure 6:
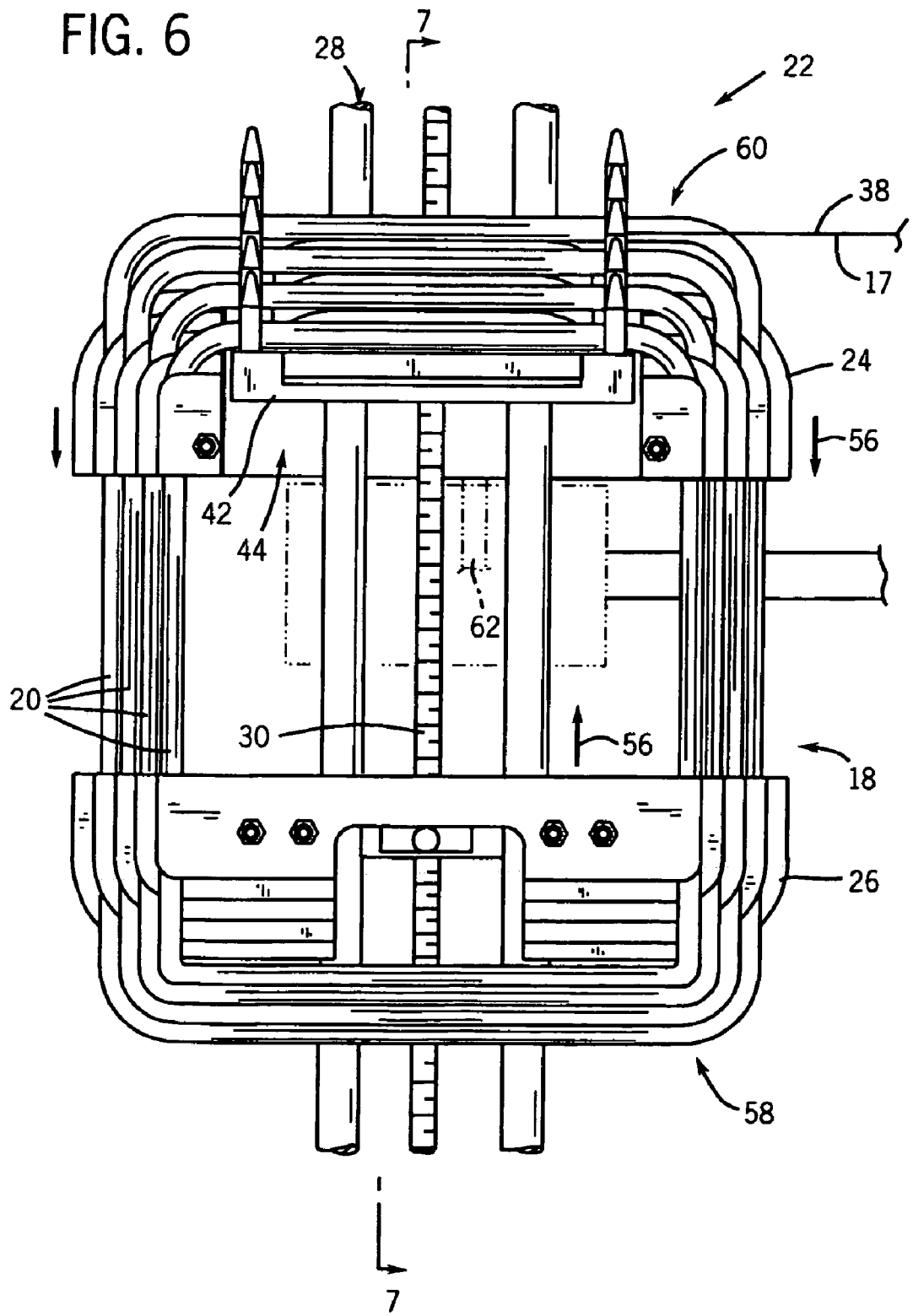
FIG. 6 is a plan view of the winding assembly of FIG. 3 illustrated in a collapsed configuration.

Turning to FIG. 6, once each group 18 of coil loops 20 is formed, it is removed from the winding shrouds 24 and 26 for insertion into the stator 10, more particularly, into the stator slots 12. Advantageously, the wire 38 may be cut from the wire source 40 (FIG. 3), thereby creating a terminal lead 17. To remove the coil loops 20 of each group 18, the winding shrouds 24 and 26 may be drawn in towards one another, as represented by the directional arrows 56. In the exemplary coiling assembly 22, the winding shrouds 24 and 26 may be drawn towards one another via the lead screw 30 that is coupled to the frame assembly 28. However, as will be appreciated by those of ordinary skill in the art, any number of actuating mechanisms may be employed to draw in (i.e., decrease) the distance between the winding shrouds 24 and 26.

Figure 7:
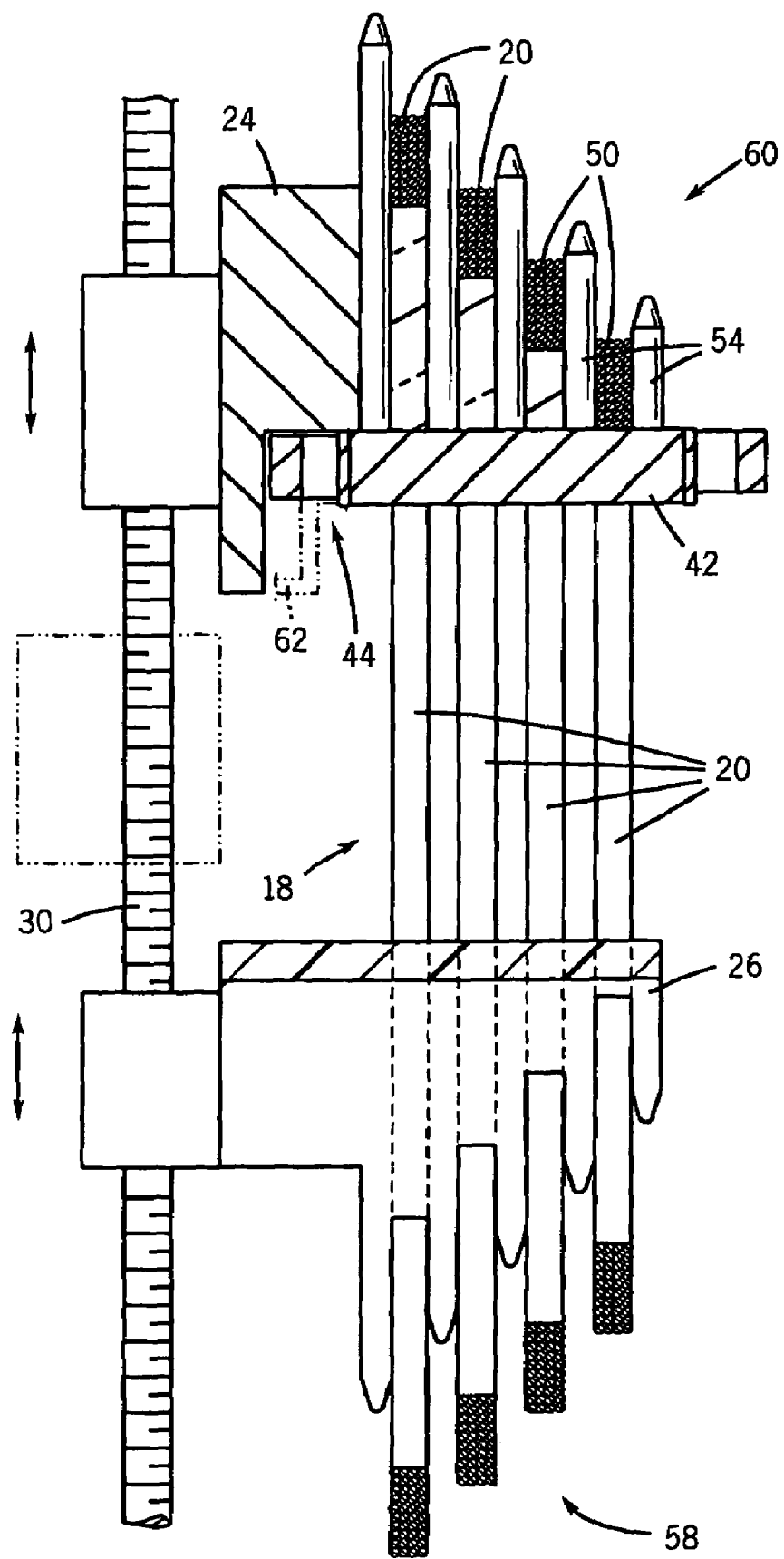
FIG. 7 is a cross sectional view of the winding assembly of FIG. 6 along line 7-7.

As the shrouds 24 and 26 are drawn towards one another into a collapsed configuration, as illustrated in FIGS. 6 and 7, a number of events may occur. For example, the lower end-turns 58 of each coil loop 20 may begin to separate from the channels 32 of the lower winding shroud 26. Accordingly, the coil loops 20 are supported, in the vertical direction, effectively by the upper end-turns 60, which are disposed in the respective channels 32 of the upper winding shroud 24. Furthermore, as the upper winding shroud 24 is drawn down (i.e., towards the lower winding shroud 26), the transfer tool 42 of the exemplary coiling assembly 22 is received by the recessed portion 44 located, by way of example, in the upper shroud 24. As stated above, the transfer tool 42 may be selectively couplable to the frame assembly 28 via the mounting arm 62 and may be stationary with respect to the moving winding shrouds 24 and 26. As stated above, any number of coupling mechanisms, such as latches, bolts, and screws, may be employed to selectively couple the transfer tool 42 to the frame assembly 28 or mounting arm 62.

At a predetermined distance between the upper and lower winding shrouds 24 and 26, the transfer tool 42 is received in the recessed portion 44 of the upper shroud 24 such that the coil supports 50 begin to engage with the upper end-turns 60 of each coil loop 20. Moreover, the partition members 54 are received between each of the coil loops 20, and maintain the segregation of adjacent coil loops 20. Advantageously, the partition members 54 may have speared tips that facilitate receipt of the coil loops 20 with respect to the transfer tool 42. As the upper winding shroud 24 continues to move further downwards, the coil supports 50 of the transfer tool 42 begin to fully support the coil loops 20. In other words, the coil supports 50 lift the coil loops 20 from the respective channels 32 of the upper winding shroud 24. Upon further downward movement of the upper winding shroud 24, the coil loops 20 are supported primarily by the transfer tool 42. That is, the coil loops 20 of the given group 18 will be separated from the winding shrouds 24 and 26. Advantageously, the rigidity of the wire 38 in the coil loops 20 may maintain the overall shape of each loop 20, upon separation of each loop 20 from the shrouds.

Because the coil supports 50 of the exemplary transfer tool 42 are advantageously configured to match the stepped configuration of the channels 32, the stepped arrangement of the coil loops 20 is maintained, as is the aspect ratio of each coil. That is, the concentric and graduated arrangement of the loops 20 with respect to one another is maintained even upon separation of the loops 20 from the winding shrouds 24 and 26. By integrating the transfer tool 42 into the winding assembly 22, the step of rearranging the coil windings after insertion into the stator is eliminated. That is, the coil loops 20 of each group may be removed from the coiling assembly 22 in a configuration that mitigates the need for manual recreation of the stepped configuration after insertion of the loops 20 into the stator 10. Moreover, as further discussed below, by maintaining the stepped configuration, a more symmetric and balanced motor construction may be achieved.

Additionally, as discussed above, adjacent partition members 54 may be horizontally spaced with respect to one other to correspond to the cross sectional width of each channel 32. Accordingly, the partition members 54 maintain the vertical configuration or aspect ratio (i.e., greater cross sectional height than width) of each coil loop 20. Advantageously, as discussed further below, by maintaining this vertical configuration, the coil loops 20 may be more easily inserted into the vertically profiled stator slots 12. An additional step to funnel the coil loops 20 into the vertical configuration may thus be eliminated, thereby reducing coiled stator manufacture times by upwards of fifty percent. Moreover, the tight packing of each coil loop 20 established during winding may also be maintained. This may, in turn, allow for increased stator slot 12 fill densities, thereby increase the operational performance of the motor.

Once the coil loops 20 of each group 18 have been fully received by the transfer tool 42, a motor fabricator, for example, may uncouple the transfer tool 42 from the frame assembly 28 and coiling assembly 22, thereby decoupling the coiled loops 20 from the respective assemblies as well. Indeed, the motor fabricator may maintain the wound configurations (e.g., stepped and vertical configurations) of the coil loops 20 with respect to one other via the transfer tool 42.

The transfer tool 42 may be coupled to an insertion tool of generally known design to facilitate insertion of the coil loops 20 into the stator 10, as illustrated in FIG. 8. Those of ordinary skill in the pertinent art will appreciate that various insertion tools for inserting coil loops in motor stator slots are available. The transfer tool 42, once coupled to the insertion tool, may be drawn axially through the stator, that is in a direction parallel with the stator slots 12. Because the transfer tool 42 has advantageously retained the vertical configuration or aspect ratio of the coil loops 20, the configuration of each coil loop 20 corresponds with the cross sectional profile of each slot 12. That is, the coil loops 20 are in an orientation such that the coil loops 20 are threadable into the appropriate openings in the stator slots 12. Indeed, the orientation of each coil loop 20 corresponds with the orientation of each stator slot 12. Once initially threaded, the insertion tool drags each coil loop 20 into and through the appropriate slots 12. The insertion tool, and the transfer tool 42 coupled thereto, may be recalled positionally, thereby leaving the group 18 of coil loops 20 at the appropriate location in the stator. This process may then be repeated for the remaining five groups 18 of coil loops 20, as further discussed below.

Moreover, as those of ordinary skill in the art will appreciate, to achieve operational balance of the motor, the coil ends 16 (see FIG. 1) may be symmetrically and tightly laced. Accordingly, the end-turns 58 and 60 (see FIG. 5) of the coil loops 20 of each group 18 are generally nested with respect to one other. In the illustrated embodiment, nesting is done by pressing the ends of the coils into alignment at generally the same radial dimension (i.e., around the end of the stator). The nesting is greatly facilitated by the graduated or stepped placement of the coil ends, allowing each coil loop to avoid interference with others in the group. Thus, it is desirable for each group 18, once inserted into the stator, to be in the stepped configuration. Because the transfer tool 42 has retained the stepped configuration of each group 18 of coil loops 20 established during winding of the wire, this stepped configuration need not be recreated by hand. By eliminating the manual process, coil winding insertion and binding times may be reduced by upwards of one to two hours per stator.

Furthermore, as will also be appreciated by those of ordinary skill in the pertinent art, to achieve operational balance in the motor, the coil ends 16 are advantageously symmetrical and nested with respect to one another. That is, the amount of coiled wire in each end is substantially identically, thereby improving the electrical symmetry of the motor. Because the transfer tool 42 retains the stepped and concentrically aligned configurations of the coil loops 20 in each group 18, the loops 20 inserted into the stator are substantially symmetrical with respect to each end of the stator. Moreover, by alleviating the need for the manual recreation of the stepped configuration, errors due to, for example, human repositioning of the coiled wire may also be mitigated. Accordingly, the coil windings of the stator 10, once laced, are balanced with respect to one another. Such balance, advantageously, may lead to increased motor efficiency, thereby improving the operating performance of the motor.

Figure 9:
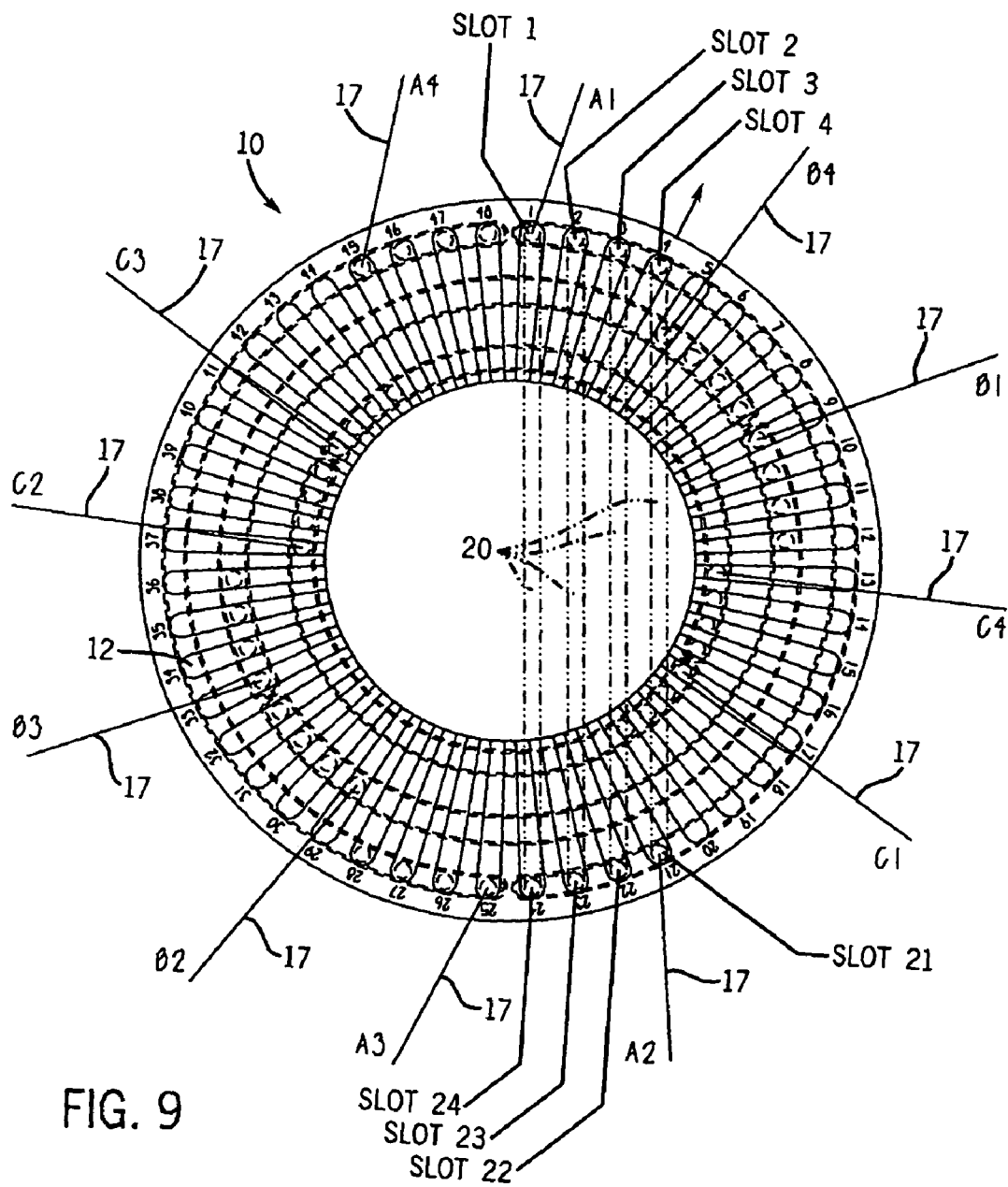
FIG. 9 is a diagram of an exemplary non-shared concentric coil winding pattern in the motor stator of FIG. 1.

As discussed above, in the illustrated stator, each phase of three phase power (labeled as "A," "B," and "C" in FIG. 9) will be carried over two groups 18 of four coil loops 20 (i.e., each phase of power will be carried over eight coil loops disposed in sixteen discrete slots 12). In the exemplary two pole/forty-eight slot motor, each coil loop 20 of a group 18 is inserted into specified discrete slots 12 of the stator 10, in accordance with the predetermined winding pattern. For example, a non-shared slot concentric winding pattern as illustrated in FIG. 9. If one side of the largest coil loop 20 is placed in a slot 12, labeled for the purpose of explanation as "Slot 1," then the opposite side of the largest coil loop 20 is received in "Slot 24," that is twenty-three slots away from the first slot (i.e., "Slot 1"). The next largest coil loop 20 is then inserted into "Slot 2," which is adjacent to "Slot 1," and "Slot 23," which is adjacent to "Slot 24." Keeping with the pattern, the remaining coil loops 20 are inserted into "Slot 3" and "Slot 22," and "Slot 4" and "Slot 21" respectively. This process may then be repeated for the remaining groups 18. Advantageously, each group 18 of coil windings will have two terminal leads 17 (e.g., "A1" and "A2") that are each externally coupled to one phase of three phase power, thereby routing the current through the stator. Once a group 18 of coil loops 20 has been inserted, the stepped configuration of the loops 20 allows the group to be flattened to a nested arrangement, as shown in FIG. 2. Advantageously, this nested arrangement, as discussed above, provides operational balance to the motor and facilitates tight lacing and binding of the coil ends 16 (see FIG. 1).

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims. For example, as discussed above, many different stator arrangements and winding patterns may benefit from the present technique, including stators having more or fewer than forty-eight slots, stators with shared and non-shared slots, and stators designed for different number of poles, phases and so forth.

What is claimed is:

1. A tool for transferring coil windings to a motor stator, the motor stator having a longitudinal center axis and a central plane encompassing the center axis, the tool comprising:
   a first coil support portion configured to maintain a first bundle of coiled wire at a first height for insertion into a first set of motor stator slots, the first height being parallel to the plane; and
   a second coil support portion configured to maintain a second bundle of coiled wire at a second height above the first height for insertion into a second set of motor stator slots adjacent to the first set of slots, the second height being parallel to the plane; and
   a least one partition member disposed between the first and second coil support portions;
   wherein the tool is adapted to be inserted in an interior of the motor stator along a center axis of the stator such that with the first and second coil supports maintaining the first and second bundles at the first and second heights, the first and second bundles are in position to be received in the first and second sets of stator slots.

2. The tool as recited in claim 1, wherein the coil support portions and partition member are configured to maintain each bundle of coiled wire in an vertical configuration such that the cross section of the bundle of coiled wire has a greater height than width as determined with respect to the corresponding support portion.

3. The tool as recited in claim 1, comprising a third coil support portion configured to maintain a third bundle of coiled wire at a third height above the second height for insertion into a third set of motor stator slots adjacent to at least one of the first and second set of slots.

4. The tool as recited in claim 1, wherein the coil support portions comprise a plastic material.

5. The tool as recited in claim 1, wherein the coil support portions include arcuate surface.

6. The tool as recited in claim 1, wherein the at least one partition member comprises a plurality of spear-tipped members.

7. A form assembly for coiling wire, comprising:
   a winding assembly including first and second wire guides each having a plurality of channels for receiving bundles of wire, the channels defining planes parallel and being configured to arrange the bundles of wire in each wire guide in a stepped configuration with respect to one another, and a frame assembly configured to couple the first and second wire guides; and
   a transfer tool selectively couplable to the winding assembly between the first and second wire guides, wherein the transfer tool is configured to maintain the stepped configuration of the bundles of wire upon removal of the bundles of wire from the wire guides; and
   wherein the first and second wire guides are selectively adjustable to positions that correspond to positions of stator slots in an electrical device and allow the bundles in each wire guide to be received in the stator slots as the winding assembly and tool are inserted into an interior of the stator along a center axis of the stator parallel to the planes defined by the channels.

8. The form assembly as recited in claim 7, wherein the frame assembly is configured to selectably adjust the distance between the first and second wire guides.

9. The form assembly as recited in claim 7, wherein the transfer tool comprises a first and second coil support portions respectively configured to maintain a first bundle of wire at a first height and a second bundle of wire at a second height in accordance with the stepped configuration.

10. The form assembly as recited in claim 9, wherein the transfer tool is configured to maintain each of the first and second bundles of wire in a vertical configuration upon decoupling of the transfer tool from the winding assembly such that each bundle of wire has a greater cross section height than width as determined with respect to the corresponding coil support portions.

11. The form assembly as recited in claim 9, wherein the coil support portions comprise arcuate surfaces.

12. The form assembly as recited in claim 7, comprising a latching mechanism configured to selectably secure the transfer tool to the winding assembly.

13. The form assembly as recited in claim 7, wherein at least one of the first and second wire guides comprises a receiving portion configured to receive the transfer tool at a predetermined distance between the first and second wire guides.

14. The form assembly as recited in claim 7, wherein the winding assembly is couplable to a rotating member.

15. A wire form assembly configured to coil a wire for insertion in a motor stator having a plurality of stator slots, each stator slot having a slot profile defined by a cross section of the slot perpendicular to the longitudinal axis of the stator, comprising:
- a winding assembly including first and second wire guides having a plurality of channels for receiving bundles of wire, the channels being configured to arrange the bundles of wire in each wire guide in a stepped configuration with respect to one another and in a vertical configuration such that the orientation of the bundle of wire corresponds to the stator slot profile for insertion of the bundle of wire into the stator slot, the vertical configuration defining planes parallel to the longitudinal axis of the stator; and
- a transfer tool selectively couplable to the winding assembly between the first and second wire guides, wherein the transfer tool is configured to maintain the bundles of wire in the stepped configuration and the vertical configuration upon removal of the bundles of wire from the wire guides as the winding assembly and transfer are tool are inserted into an interior of the stator along the longitudinal axis of the stator and the bundles are received into the stator slots.

16. The wire form assembly as recited in claim 15, wherein the transfer tool comprises a plurality of coil support portions configured to maintain the bundles of wire in the stepped configuration upon removal of the bundles of wire from the wire guides.

17. The wire form assembly as recited in claim 16, wherein the coil support portions comprise arcuate surfaces.

18. The wire form assembly as recited in claim 16, wherein the transfer tool comprises a plurality of partition portions configured to maintain the bundles of wire in the vertical configuration in cooperation with the coil support portions.

19. The wire form assembly as recited in claim 15, wherein the winding assembly is couplable to a rotating member.

20. A winding form assembly for coiling wire for insertion into a motor stator, the motor stator having a longitudinal center axis and a central plane encompassing the center axis, the winding form assembly comprising:
- a winding assembly including first and second wire guides having a plurality of channels for receiving bundles of coiled wire, the channels defining planes parallel to the stator central plane and being configured to arrange the bundles of coiled wire in each wire guide in a stepped configuration with respect to one another, and a frame assembly configured to couple the first and second wire guides; and
- a transfer tool selectively couplable to the winding assembly between the first and second wire guides, comprising a first coil support portion configured to maintain a first bundle of coiled wire at a first height for insertion into a first set of motor stator slots, a second coil support portion configured to maintain a second bundle of coiled wire at a second height above the first height for insertion into a second set of motor stator slots; and
- wherein the tool and winding assembly are adapted to be inserted in an interior of the motor stator along the center axis of the stator such that with the first and second coil supports maintaining the first and second bundles at the first and second heights, the first and second bundles are in position to be received in the first and second set of stator slots.

21. The winding form assembly as recited in claim 20, wherein at least one of the coil support portions includes an arcuate surface.

22. The winding form assembly as recited in claim 20, wherein the channels are defined by a plurality of wall portions and a base portion, and wherein the channels are configured to arrange the bundles of coiled wire located respectively therein in a vertical configuration such that the cross section of each bundle of coiled wire has a greater height than width as determined with respect to the base portion.

23. The winding form assembly as recited in claim 20, wherein the coil support portions and the at least one partition member are configured to maintain the vertical configuration of the bundles of coiled wire upon removal of the bundles of coiled wire from the wire guides.

\* \* \* \* \*